Dec. 9, 1947.   M. A. EDWARDS   2,432,399
ELECTRICAL CONTROL DEVICE
Original Filed April 24, 1935

Inventor:
Martin A. Edwards,
by Harry E. Dunham
His Attorney.

Patented Dec. 9, 1947

2,432,399

UNITED STATES PATENT OFFICE 2,432,399

ELECTRICAL CONTROL DEVICE

Martin A. Edwards, Schenectady, N. Y., assignor to General Electric Company, Schenectady, N. Y., a corporation of New York Application April 24, 1935, Serial No. 17,988
Renewed May 27, 1938

7 Claims. (Cl. 323—75)

This invention relates to electrical control devices, more particularly to reactance bridges, and it has for an object the provision of a simple, reliable and improved device of this character.

One of the undesirable features of reactance type bridges heretofore utilized was the introduction of harmonic voltages in the ouput circuit as a result of saturation effects in the iron core. The use of filters to eliminate these harmonic voltages proved to be unsatisfactory because the losses in the filters were of a magnitude sufficient to disturb the proper operation of the bridge. Accordingly a further object of this invention is the provision of a reactance type bridge in which the formation of harmonic voltages in the bridge circuit is effectively suppressed without the use of filters.

A further object of the invention is the provision of a saturable core type reactance bridge in which there is no transformer action between the reactance winding and the saturating or magnetization control winding.

A still further object of this invention is the provision of means for controlling the time constant of the reactance bridge.

In carrying the invention into effect in one form thereof, a plurality of reactance windings are connected to form a bridge and a single core member is provided for the windings constituting each pair of opposite bridge arms. The core structure and the arrangement and connection of the windings prevent the formation and introduction of harmonic voltages in the output circuit.

Figure 1:
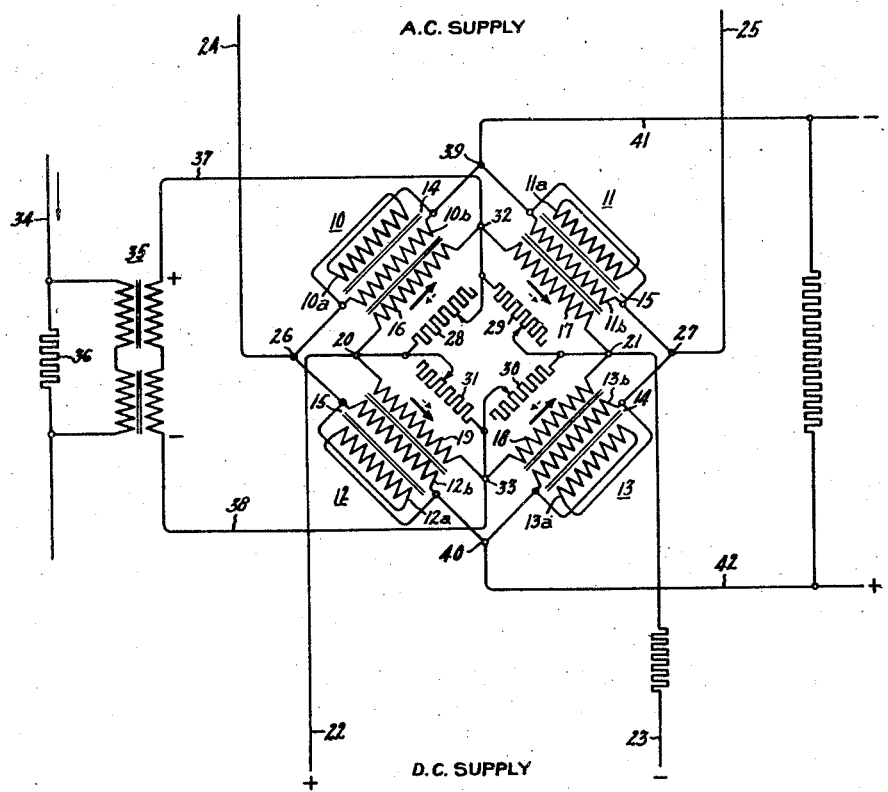
Figure 2:
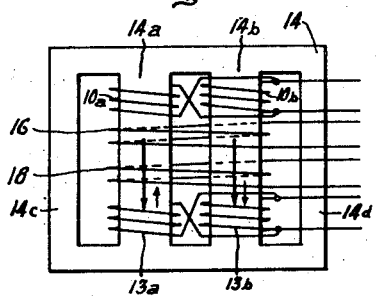

For a better and more complete understanding of the invention reference should now be had to the following specification and to the accompanying drawing in which Fig. 1 is a simple, diagrammatical illustration of an embodiment of the invention and Fig. 2 is a simple diagrammatical illustration of the core structure of one-half of the bridge and the arrangement of the windings thereon.

Referring now to the drawing, a plurality of alternating current reactance windings 10, 11, 12 and 13 are connected in the form of a Wheatstone bridge. Each of these windings comprises two separate coils connected in parallel. As shown, the winding 10 comprises coils 10a and 10b, and similarly the windings 11, 12, and 13 comprise coils 11a and 11b, 12a and 12b and 13a and 13b respectively.

The coils of windings 10 and 13 constituting one pair of opposite bridge arms are mounted on a common core structure 14. Similarly the coils of windings 11 and 12 constituting the other pair of opposite bridge arms are mounted on a common core structure 15.

For the purpose of controlling the magnetic saturation of the cores and therefore the reactance of the bridge, a plurality of direct current magnetization control windings 16, 17, 18 and 19 are provided. These windings are connected in the form of a bridge, as illustrated, and the windings 16 and 18 are mounted on the core structure 14 and the windings 17 and 19 are mounted on the core structure 15.

As shown in Fig. 2, the core structure 14 has two winding legs 14a and 14b, and two outside legs 14c and 14d, which carry no windings. The reactance coils 10a and 10b are mounted on the winding legs 14a and 14b respectively, and similarly the reactance coils 13a and 13b of the opposite bridge arm are mounted on the winding legs 14a and 14b respectively. Likewise the direct current magnetization control windings 16 and 18 are mounted on the core structure 14 surrounding both winding legs 14a and 14b.

Voltage is supplied to the opposite bridge points 20 and 21 of the direct current winding from a suitable source represented by supply lines 22 and 23. The side 22 of the supply source is assumed to be positive and the side 23 negative, as indicated in the drawing. Alternating voltage is supplied from a suitable source represented by supply lines 24, 25 to the opposite bridge points 26, 27 of the reactance winding.

The direct current windings 16 and 18 are connected in the bridge circuit and arranged on the core structure so that they magnetize the winding legs 14a and 14b in the direction represented by the heavy arrows pointing downwardly. Both reactance coils 10a and 13a are so connected and mounted on the winding leg 14a that their magnetizations are additive, and similarly the reactance coils 10b and 13b are connected and mounted on the winding leg 14b so that their magnetizations are additive. However, as indicated in both Figs. 1 and 2 the coils 10a and 13a are respectively connected in parallel with reactance coils 10b and 13b so that during any one half cycle of the applied alternating voltage the magnetization produced by one pair of these windings will oppose the direct current magnetization whilst the magnetization produced by the other pair will be in the same direction as the direct current magnetization. For example, during the half cycle of applied alternating voltage in which the flux produced by coils 10a and 13a opposes the direct current magnetization in winding leg 14a the magnetization produced by coils 10b and 13b is in the same direction as the direct current magnetization in leg 14b as indicated in Fig. 2 by the light line arrows.

During this half cycle, the magnetic flux in the winding leg 14b does not increase because it is already magnetized to saturation by the direct current saturating windings 16 and 18. The reactance of the windings 10b and 13b is therefore minimum and since the flux in the leg 14b does not change the reactive voltage drops across the coils 10b and 13b and the coils 10a and 13a which are respectively connected in parallel therewith do not change but remain substantially constant during this half cycle. In the succeeding half cycle the action is similar. The flux produced by coils 10a and 13a are in the same direction as the direct flux in leg 14a but the flux in this leg cannot increase because it is already saturated by the direct magnetization. Consequently the reactive voltage drops across the reactance coils 10a and 10b, 13a and 13b remain substantially constant with the result that no harmonic voltage is introduced in the alternating voltage output circuit of the bridge.

It will also be observed that since the alternating fluxes in the legs 14a and 14b pass through the turns of the direct current windings 16 and 18 in opposite directions, there is no mutual coupling between the direct current windings 16, 18 and the alternating current windings 10, 11, 12 and 13. Thus, transformer action between these windings is eliminated, and no alternating voltage can be induced in the direct current windings. Likewise, if there should be any harmonic or ripple voltage due to rectification in the direct voltage supplied to the direct current windings, such harmonic or ripple voltage can not be induced in the alternating current windings.

The core member 15 and the arrangement of reactance coils 11a, 11b, 12a, 12b and direct current magnetization windings 17, 19 thereon is identical with the foregoing arrangement and a separate description of this half of the bridge is therefore unnecessary.

It is often desirable to change the time constant of the bridge, and for this purpose variable resistances 28, 29, 30 and 31 are connected in parallel with the direct current windings 16, 17, 18 and 19 respectively. By means of these variable resistances, the resistance of the shunt path about each direct current winding can be varied from open circuit to complete a short circuit thereby providing for varying the time constant of the bridge through a wide range of values.

In operation in a control system, the opposite equipotential bridge points 32 and 33 of the direct current magnetization control winding are connected to a controlling circuit 34 through a transformer 35. The primary terminals of the transformer 35 are connected in parallel with a shunt 36 in the circuit 34, and the secondary terminals of the transformer are connected to the bridge points 32, 33 by means of conductors 37, 38 thus constituting an input circuit to the reactance bridge. The equipotential bridge points 39, 40 are connected by means of conductors 41, 42 to some circuit or device which it is desired to control thus constituting an output circuit. The controlling circuit 34 may be any circuit such for example as the armature circuit of an electric motor and the output circuit 41, 42 may be connected to any devices that it may be desired to control, such for example as the grid circuits of electric valve apparatus which it is desired to control in accordance with some function or operating characteristic such as the armature current of an electric motor.

Assuming the bridge to be balanced when the current in the circuit 34 is constant, the bridge points 39 and 40 will have the same potential and consequently no voltage exists across the terminals of the output circuit 41, 42. The direction of current flow in the direct current bridge windings in Fig. 1 is represented by the heavy arrows.

As long as the current in circuit 34 remains constant this balanced condition continues. However, if the current in the circuit 34 increase, a voltage proportional to the rate of change of current is induced in the secondary winding of transformer 35. It may be assumed that the polarity of this voltage is such that the upper secondary terminal of the transformer 35 is positive and the lower terminal is negative. This voltage is applied to the equipotential points 32, 33 of the direct current saturating winding and tends to cause current to flow in the coils 16, 17, 18 and 19 of this winding in the directions indicated by the dotted arrows. Consequently, the flow of current in the windings 16 and 18 is decreased whilst the flow of current in the windings 17 and 19 is increased. The decrease in the saturating direct current in the coils 16 and 18 increases the reactance of the reactance windings 10 and 13 and similarly the increase in the saturating direct current in the coils 17 and 19 tends to decrease the reactance of the reactance windings 11 and 12. However, a very little decrease in the reactance of the windings 11 and 12 takes place because the core member upon which these coils are wound is already substantially saturated.

Since the reactance of the reactance windings 10 and 13 is increased, the reactive voltage drop across these windings is increased in proportion. During the half cycle of alternating voltage in which the side 24 of the alternating current source is positive, the increased reactive voltage drop across the reactance winding 10 will cause the point 39 to become more negative than the point 40 and similarly the increased reactive voltage drop across the reactance winding 13 will cause the point 40 to become more positive than the point 39. Consequently, a voltage appears across the output circuit 41, 42, as indicated by the plus and minus signs associated with this circuit in the drawing.

This voltage in the output circuit may be utilized to control any device, for example the electric valve apparatus previously mentioned, in any desired manner.

When the increase in current in the controlling circuit 34 terminates, the balance of the bridge is restored and the voltage drop across the output circuit 41, 42 disappears. If the current in the circuit 34 decreases instead of increases during the half cycle in which the voltage of the side 24 of the alternating current supply source is positive, the polarity of the output circuit voltage will be reversed.

Although in accordance with the provisions of the patent statutes, this invention is described as embodied in concrete form, it will be understood that the apparatus and connections shown and described are merely illustrative, and that the invention is not limited thereto since alterations and modifications will readily suggest themselves to persons skilled in the art without departing from the spirit of this invention or the scope of the annexed claims.

What I claim as new and desire to secure by Letters Patent of the United States, is:

1. A control device comprising a pair of magnetic core members each having a pair of winding legs, and a plurality of windings connected to form a bridge, each arm of said bridge having two coils, one coil of each of opposite arms of said bridge being mounted on one leg of one of said core members and the other coil of each of said arms being mounted on the other leg of said one core member.

2. A control device comprising a plurality of windings connected to form a bridge, each arm having a pair of coils, a core member having a pair of winding legs for each pair of opposite arms of said bridge with one coil of each of opposite arms mounted on one leg thereof and the other coil of each of said opposite arms mounted on the other leg.

3. A control device comprising a plurality of windings connected to form a bridge, each arm having a pair of coils, a core member having a pair of winding legs for one pair of opposite arms of said bridge with one coil of each of said opposite arms mounted on one of said legs and the other coil mounted on the other of said legs, and a second core member having a pair of winding legs for the other pair of opposite arms with one coil of each of said other opposite arms mounted on one leg of said second core member and the other coil mounted on the other leg.

4. A saturable core type reactance control device comprising a bridge, each arm of said bridge comprising a direct current winding and a pair of reactance coils, and a pair of magnetic core members each having a pair of winding legs with one reactance coil of each of opposite arms mounted on one of said legs, the other reactance coil of each of said opposite arms mounted on the other leg and the direct current windings of each of said opposite arms surrounding both said legs.

5. A saturable core type reactance control device comprising a bridge, each arm of said bridge comprising a direct current winding and a pair of reactance coils, a magnetic core member having two winding legs for each pair of opposite arms of said bridge with one reactance coil of each of said opposite arms mounted on one of said legs and the other reactance coil mounted on the other of said legs and the direct current windings of said opposite arms surrounding said legs, and connections from a source of alternating current to said coils whereby the magnetization produced by one of said coils adds to the direct current magnetization and the magnetization of the other of said coils opposes the direct current magnetization thereby to prevent introduction of harmonic voltages in the circuit of said coils.

6. A control system comprising in combination, a control device comprising a bridge having a direct current winding and an alternating current reactance winding, each arm of said bridge comprising a direct current coil and a pair of reactance coils, a core member having two winding legs for each pair of opposite bridge arms with one reactance coil of each of said opposite bridge arms mounted on one of said legs, the other reactance coil of each of said bridge arms mounted on the other of said legs, and the direct current coil of each of said opposite arms surrounding both said legs whereby current in one of said windings is prevented from inducting a voltage in the other of said windings, the reactance coils on one of said legs being connected for opposite polarity with respect to the reactance coils on the other of said legs to prevent introduction of harmonic voltages in the winding circuits, connections from a source of alternating voltage and a source of direct voltage to said reactance windings and direct current windings respectively, and connections from a control circuit and a controlled circuit to opposite bridge points of said windings.

7. A saturable core type reactance device comprising a bridge having a reactance winding and a direct current magnetization control winding, each arm of said bridge having a reactance coil and a direct current coil, a core member for the coils of each pair of opposite bridge arms, and a separate variable resistance connected in parallel with each of said direct current coils for controlling the time constant of said bridge.

MARTIN A. EDWARDS.

REFERENCES CITED

The following references are of record in the file of this patent:

UNITED STATES PATENTS

| Number | Name | Date |
|---|---|---|
| 1,328,797 | Alexanderson | Jan. 20, 1920 |
| 1,390,543 | Re Qua | Sept. 13, 1921 |
| 1,625,282 | Re Qua | Apr. 19, 1927 |
| 1,824,577 | Sorensen | Sept. 22, 1931 |
| 1,836,886 | Thompson | Dec. 15, 1931 |
| 1,844,704 | Thompson | Feb. 9, 1932 |
| 1,885,155 | Suits | Nov. 1, 1932 |
| 1,921,703 | Schmidt | Aug. 8, 1933 |
| 1,940,335 | Suits | Dec. 19, 1933 |
| 1,965,439 | Stoller | July 3, 1934 |
| 1,986,112 | Logan | Jan. 1, 1935 |
| 2,044,066 | Locke | June 16, 1936 |
| 2,082,607 | Amsden | June 1, 1937 |

FOREIGN PATENTS

| Number | Country | Date |
|---|---|---|
| 376,861 | England | July 21, 1932 |
| 391,474 | England | Apr. 12, 1933 |